US006718312B1

(12) United States Patent
McAfee et al.

(10) Patent No.: US 6,718,312 B1
(45) Date of Patent: Apr. 6, 2004

(54) METHOD AND SYSTEM FOR COMBINATORIAL AUCTIONS WITH BID COMPOSITION RESTRICTIONS

(75) Inventors: R. Preston McAfee, Austin, TX (US); Paul Milgrom, Palo Alto, CA (US)

(73) Assignee: Market Design Group, Inc., Bethesda, MD (US)

( * ) Notice: Subject to any disclaimer, the term of this patent is extended or adjusted under 35 U.S.C. 154(b) by 0 days.

(21) Appl. No.: 09/416,587

(22) Filed: Oct. 12, 1999

(51) Int. Cl.[7] ............................................... G06F 17/60
(52) U.S. Cl. ....................................................... 705/37
(58) Field of Search ............................ 705/37, 26, 27, 705/40, 44, 36, 35

(56) References Cited

U.S. PATENT DOCUMENTS 5,905,975 A * 5/1999 Ausubel ...................... 705/26
6,021,398 A * 2/2000 Ausubel ...................... 705/26
6,272,473 B1 * 8/2001 Sandholm ................... 705/26

FOREIGN PATENT DOCUMENTS

WO 00/41108 * 7/2000 .......... G06F/17/60

OTHER PUBLICATIONS

"Winner Determination in Combinatorial Auction Generalizations" describes various combinatorial market types and winner determination theories. http://www.cs.cmu.edu/~sandholm/generalizations.agents01ws.pdf. agilpin@combinet.com.*

* cited by examiner

Primary Examiner—Jeffrey Pwu
(74) Attorney, Agent, or Firm—Skadden, Arps, Slate, Meagher & Flom LLP

(57) ABSTRACT

A method and system for dynamic combinatorial auctions employing bid composition restrictions is disclosed. Three exemplary types of bid composition restrictions, which may be applied either singly or in combination, are disclosed: non-additive activity restrictions, subset restrictions, and superset restrictions. These restrictions produce more efficient auction outcomes by placing extra constraints on bidders who specify larger combinations in their bids, thereby penalizing attempts at strategic bidding without ruling out genuine attempts to avoid an exposure problem.

21 Claims, 7 Drawing Sheets

METHOD AND SYSTEM FOR COMBINATORIAL AUCTIONS WITH BID COMPOSITION RESTRICTIONS

FIELD OF INVENTION

The present invention relates to computer implementations of simultaneous auctions of multiple items, wherein combinatorial bidding is permitted. More particularly, the present invention involves the use of bid composition restrictions to pace such auctions and to eliminate certain damaging strategic manipulations that have been used by bidders in such auctions.

BACKGROUND OF INVENTION

I. Prelude: Simultaneous Bidding in the FCC Spectrum Auctions

Since 1994, when the U.S. Federal Communications Commission (FCC) adopted the simultaneous ascending auction. ("SAA", also known as the "simultaneous multiple round auction," as its primary auction method, more than $20 billion of radio spectrum has been sold using this method. Initial public reaction to the spectrum auctions was enthusiastic. A 1995 New York Times article describing the FCC's auction of spectrum for personal communications services carried the headline: "The Greatest Auction in History." A balanced review by the Congressional Budget Office gave the whole series of FCC auctions high marks for both novelty and successful outcomes.

Although the SAA incorporates significant new elements, some of its rules resemble those of the well-known "silent auctions" commonly used in charity sales. In silent auctions, tables are filled with the multiple lots to be sold (or pictures or descriptions of the items), and bidders write their bids in a list on a page beside each lot.

Like the silent auction, the SAA is a simultaneous sale of multiple items in which bidding closes for all the items at the same time: However, the SAA differs from the silent auctions in several ways. First, at least in the variant used by the FCC, SAA bids are submitted in a series of discrete rounds rather than continuously in time. Second, the SAA typically employs a computerized interface that makes it practical to run the auction remotely (for example, by a dial-in system or over the Internet), which in turn makes its practical to extend the auction over a long period of time. When an electronic implementation is used, it also enables bidders to keep track of bidding on many related items in a simple manner. Third and most important, the SAA incorporates some rules that are distinctly different from the silent auction. Among these are the closing rule that keeps bidding open for all items until there is a sufficient period with no new bidding for any item, the activity rule that prevents a bidder from refraining from active bidding until near the end of the auction, and the bid increment rule that controls the pace of the auction by determining appropriate minimum bid increments.

The FCC has conducted simultaneous ascending auctions for as few as ten or as many as 2,000 spectrum licenses. Although most SAAs conducted to date have been spectrum sales, SAAs have been run successfully in several countries for a wide variety of assets and contract obligations, including undeveloped real estate, mining rights, and standard offer electrical service obligations.

To fully appreciate the contribution of the present invention, it is important to understand: a) economic auction theory, b) the mechanics of combinatorial auctions, and c) prior art bid restrictions, i.e., additive activity rules.

II. Economic Auction Theory

A. Efficiency as the Objective of Auction Designs

In a seller's auction, an allocation of goods is economically "efficient" if the overall value—consisting of the price received by the seller plus the net value received by the winning bidders—is as large as possible. (Buyer's auctions have an analogous standard.) Economic efficiency is a fundamental objective of both public and private sector auction sales and overall value is a key criterion for evaluating auction performance.

When governments sell assets, economic efficiency is often listed as an objective of the auction. In the U.S. spectrum auctions, federal legislation specified that "efficient use of the electromagnetic spectrum" was the primary objective of the allocation process. The FCC's initial auction order explicitly interpreted this legislative objective to mean economically efficient use. Similarly, the sales of $SO_2$ pollution permits and airport landing rights also have economic efficiency as a primary objective.

In most private sector auctions and in some public sector auctions, the seller instead specifies maximizing revenues as the main objective of the sale. However, maximizing revenues requires attracting potential bidders to participate and compete, which in turn requires holding out the possibility of significant profits for the winning bidder. According to the economics literature, the connection between participation and the winner's potential profits is so strong that it sometimes makes the problem of revenue maximization identical to the problem of overall value maximization. In practice, this justifies the rule of thumb that more efficient designs lead to higher auction revenues in seller's auctions.

B. Classical Auction Theory

The idea that concurrent bidding for multiple goods helps to find market-clearing prices and their associated efficient allocations has a long history in economic thought, dating back to the $19^{th}$ Century. At that time, economists recognized that the demand for one good would generally depend on the prices of other goods. For example, the quantity of wheat demanded at a given price would generally depend on the prices of other grains and perhaps also on the prices of other foods, as well as on the cost of milling services, transportation, storage, and so on.

Although early economic thinkers understood that market-clearing prices of different goods could not be found individually without reference to one another, they offered no practical means to discover and set such prices. The Walrasian auction, which was central to economic theories about price setting, is a dynamic process in which the price of each good may increase or decrease at different times during the auction. The non-monotonic behavior of prices in the Walrasian auction can interfere with the convergence of the process, as published examples in the economics literature have shown. Even when convergence does theoretically occur, it can be very slow because some prices will rise and fall many times before approaching their final values. Finally, the convergence or the speed of convergence of the Walrasian auction process is not something that is guaranteed. Rather, it is a prediction based on assumptions about the participants' behavior—assumptions that are contrary to the incentives of the participants and which are thus unlikely to be satisfied in reality. Consequently, although classical economic analysis was useful in identifying weaknesses in non-simultaneous price setting, it ultimately had little to contribute to the implementation of real auctions for multiple goods.

C. Recent Auction Theory

Recent scholarly research does contain ideas that are useful for designing and implementing real auctions for multiple goods. For example, it has recently been shown that a simultaneous ascending auction leads to market-clearing prices and supports economically efficient allocations if the goods offered for sale are mutual substitutes and the bidders always bid straightforwardly for the goods they want. [Two goods are "substitutes" if raising the price of one increases (or at least never reduces) demand for the other; goods are mutual substitutes if each good is a substitute for every other good in the set. For example, apples and pears are substitutes. If the price of apples were to rise significantly, some consumers would buy pears instead, thereby increasing the total demand for pears. Similarly, apples, pears, and bananas are "mutual substitutes." A bidder bids "straightforwardly" in a round when he bids as if he were the sole remaining active bidder, with all other bidders expected to make no more bids.]

The SAA also has the very desirable property that no price can ever decrease during the course of the auction. This monotonicity of prices in the SAA guarantees that the auction process will eventually end, regardless of the bidding strategies adopted by the bidders, so long as bidders limit themselves to bids they are capable of fulfilling. This guarantee is necessary for any practical auction mechanism.

The preceding observations help to explain the apparent successes of SAAs in contexts where all the goods are substitutes. However, theory has also shown that auctions that set prices individually for discrete, indivisible goods (e.g., a SAA) cannot lead to economically efficient outcomes if some of the goods are complements for some bidders, but substitutes for other bidders. (Two goods are "complements" if raising the price of one reduces demand for the other. For example, hotel rooms and airline seats are complements: an increase in the price of airline tickets tends to reduce the demand for hotel rooms by reducing the amount of consumer travel.) Indeed, the very idea that efficiency can be achieved by setting individual prices for goods fails in these circumstances because, as the theory shows, it may not be possible to balance supply and demand in all markets using prices. In such cases, pricing bundles of products, such as vacation packages that include hotel and airfare, may be necessary to clear the market.

The case of goods that can be complements for some bidders and substitutes for other bidders is of enormous practical importance. For example, in a radio spectrum auction, a license to use a band of radio spectrum in one particular area is of little practical value if the area is too small or the bandwidth too narrow. So, for some bidders, two small chunks of nearly identical spectrum may be complementary parts of a larger package. For other bidders who already own large amounts of bandwidth to which they wish to add a single chunk, the same two chunks of spectrum are likely to be substitutes.

When goods can be complements for some bidders and substitutes for others, the bidders for whom the goods are complements face an exposure problem. The exposure problem in the SAA is that a bidder must risk becoming the high bidder on at least one good in a set of complements before it knows what it will have to pay to acquire the other goods in the set. For example, consider a bidder that wishes to purchase two related goods, A and B, but only if the bidder can acquire both. At some point in the SAA, this bidder must make a high bid on A or B individually, without knowing what it might eventually cost to acquire the other good. The bidder risks the possibility that his bid for A will win while the price of B rises too high to make B's acquisition worthwhile. Overall, this can result in a loss for the bidder because A alone is not valuable to the bidder.

One consequence of the exposure problem is that bidders become reluctant to bid. This is bad for two reasons: it tends to reduce the revenue enjoyed by the seller from the auction and it may result in a loss of overall value, as goods wind up in the hands of someone who does not actually value them the most. Another consequence is that bidders may aim to gain an artificial advantage by creating an exposure problem for a competitor. If they succeed, these manipulations lead to further losses of both revenue and overall value.

In practice, parties that conduct auctions sometimes consult with bidders in advance of the auction and try to create "lots" consisting of the packages that likely high bidders will want. For example, in the FCC auctions for personal communication services (PCS) spectrum, after extensive public consultations, the lots sold included some licenses for 30 MHz of radio spectrum bandwidth (to support new entrants into PCS services) and licenses for 10 MHz of bandwidth (to enlarge existing spectrum packages).

Any decision about how to structure the lots is both technically complex and a critical determinant of the success of the auction. An example of the consequences of poorly structured lots can be found in an auction conducted by the Netherlands spectrum management agency in February 1998. This auction was for radio spectrum allocated for use in the next generation of cellular telephones. The spectrum was divided into 18 lots. Two of these were efficiently sized for a new entrant to establish service. The remaining 16 lots were small and intended to be available either to supplement existing licenses or to be combined for use by a new entrant. The outcome had three notable features. First, both large lots were acquired by new entrants to the wireless telephone business. Second, the smaller lots were acquired mostly by incumbents, that is, firms that already licensed some spectrum and offered wireless telephone services. Finally, the prices per unit of spectrum for each of the small lots were less than half of the corresponding price per unit of spectrum for the two larger lots. The low prices for the small lots are explained by examining the round-by-round behavior of bidders in the auction. New entrants that lost the bidding for the larger lots dropped out of the auction without even attempting to combine the relatively cheap small lots into large blocks, which is precisely the behavior one would expect from bidders faced with an exposure problem. The result was low prices for the poorly structured lots and a loss of overall value.

Decisions about how to structure lots in government-run auctions are politically charged because the lot packaging affects the likely auction outcome. Such decisions can also affect whether bidders choose to-participate at all.

For example, in the proceedings to structure the FCC spectrum auctions for personal communication services, MCI lobbied strongly to have a nationwide license included in the auction. For regulatory reasons, MCI was the only major U.S. telephone company eligible to bid on a nationwide license, so the creation of such a license would likely have allowed it to acquire spectrum cheaply. Conversely, without such a license offering, MCI would have faced an exposure problem, because it would risk acquiring licenses without enough geographical coverage to enable it to establish a nationwide wireless telephone system. When MCI's proposal was rejected, it decided not to participate in the auction at all.

Even an auctioneer with the best of intentions often has too little independent information to structure the lots effectively. The auctioneer must rely to some degree on the calculated representations by potential bidders. Because bidders may use these representations strategically to distort the outcome in their favor, the current politicized process of auctioneers defining lots has serious drawbacks.

In view of the difficulties that arise when the seller (or the buyer in a buyer's auction, i.e., the entity on whose behalf the auction is being held) tries to package items into lots, the best chance for efficient outcomes is often to employ an auction method that allows bidders to make "combinatorial bids" that specify the combinations they desire as well as the prices they are willing to pay. In the FCC application, the bids would specify combinations of geography and bandwidth. Combinatorial bids completely protect bidders from the exposure problem because they never force bidders to buy individual lots that they do not want.

III. Combinatorial Auctions

The use of combinatorial bidding for major assets has well-established precedents. For example, bankruptcy trustees auctioning a bankrupt firm's, assets sometimes accept bids both for the whole firm and for the individual assets, accepting the set of bids that yield the largest total price. In several recent sales in the U.S. of electrical generating assets in connection with the deregulation of electric utilities, the investment bankers running the auctions allowed bids for individual assets as well as for combinations of assets. In each of these auctions, the combinatorial bids were static, once-and-for-all bids. They could not be revised based on new information that might have emerged during the course of the auction.

A. Static Combinatorial Bidding: Theory

The theory of combinatorial bidding has a distinguished history. In the work most emphasized in his Nobel Prize citation, laureate William Vickrey introduced a version of it to economic theory. An extension of Vickrey's method (sometimes called the "generalized Vickrey auction") calls upon bidders to specify values for all possible combinations of items and determines prices based on those reported values. According to the theory, if bidders (i) had unlimited budgets, (ii) were certain about their estimates of value, and (iii) found it costless to estimate values for every one of the many combinations that might be sold, then this system would lead to outcomes that maximize the overall value created by the auction. However, because an auction for N items entails $2^N$ combinations, an auction for as few as twenty items involves more than one million combinations. Thus, even for such a modestly sized application, specifying values for all combinations becomes completely impractical, violating Vickrey's third condition.

Even if the scale difficulty can sometimes be overcome, the generalized Vickrey auction has still more shortcomings and limitations. One shortcoming is that, under Vickrey's pricing rules, two bidders who purchase identical items may be asked to pay different prices. This characteristic "price discrimination" that is built into the Vickrey auction raises a fatal objection for many government-run auctions, in which perceived fairness is commonly a paramount criterion. The same objection is also significant in privately run auctions, because the auctioneer may worry that such rules impair its ability to attract bidders.

Another class of objections to the generalized Vickrey auction is that one of the other two enumerated conditions in Vickrey's analysis fails to hold, so his conclusions do not apply. Indeed, real bidders are rarely certain about their valuations and may spend significant sums to improve their estimates and assessments in a large auction, violating Vickrey's second condition. Also, most bidders have limited budgets and thus need to limit their bid totals to what they can afford, violating Vickrey's first condition. When any one of the enumerated conditions fails, the outcome of the generalized Vickrey auction is not guaranteed to maximize total value. Even when the conditions are met, the auction is not guaranteed to maximize seller revenues. For each of these reasons, it can be better to implement a dynamic combinatorial bidding system in which bidders use the information inferred from competing bids to decide which combinations to bid on and how much to bid.

B. Dynamic Combinatorial Bidding: Theory

A "dynamic combinatorial auction" is an auction with the following features. First, bids may be made for individual lots or limited combinations of lots. Thus, a bid consists of a pair (S, b) where S is the set of lots covered and b is the money amount bid for that set. Second, the auction engine evaluates the entire set of bids submitted by all the bidders to select a set of tentative "winning" bids. The winning set is chosen from among the qualifying sets, which are sets of bids in which each lot is awarded only once. [This means that if $(S_1, b_1)$ and $(S_2, b_2)$ are any two bids in a qualifying set, then the two sets do not contain any common lots, i.e., the intersection of $S_1$ and $S_2$ is the empty set—$S_1 \cap S_2 = \emptyset$.] Among the qualifying sets, in a seller's auction, the tentative winning set is one that maximizes the total bid price. (Conversely, in a buyer's auction, the tentative winning set is the one that minimizes the total bid price.) Third, bidders receive sufficient feedback about the bids that have already been made to enable them to determine which new bids would win if no other new bids were made. Also, unlike the Vickrey auction, dynamic combinatorial auctions are usually constructed so that the price a bidder pays for a lot or combination is equal to the amount it bid.

There are many possible variations of dynamic combinatorial auctions. The auctions may be conducted in a series of discrete rounds or they may allow new bids to be submitted and evaluated at any time during the auction, or there may be a hybrid of these two schemes. Complete details about the bids received and who made them may be communicated to all the bidders immediately or with delay, or some details may be withheld entirely. A bid that is displaced from the winning set may disappear from the system immediately or be held in reserve, or it may remain in reserve unless withdrawn by the bidder. (With combinatorial bidding, a bid's status as part of the winning bid package may depend on other bids, so a bid that is displaced and held in reserve may later become part of a new winning package.)

Dynamic combinatorial bidding has at least three major advantages over its static counterpart. First, bidders do not need to specify bids for every combination of lots at the outset of the bidding. As discussed above, such lists of bids can be unreasonably long even in relatively small auctions. Second, the information that emerges during the auction can help the bidders both to select the combinations of lots on which they wish to bid and to avoid the winner's curse, i.e., the tendency of the winning bidder to be a party whose estimate of the value of the lots for sale is too high. Third, it may ease the problem of bidders who face significant budget restrictions and whose bids for some items depend not only on which other items they acquire but also on the amounts to be paid for those items.

While there is some practical experience with dynamic combinatorial auctions, most of the relevant experience comes from economics laboratory experiments. Interest in these auctions has increased because recent federal legislation requires the FCC to investigate the feasibility of combinatorial bidding for its spectrum auctions. A version of this auction that was proposed to the FCC is called the "simultaneous ascending auction with package bidding" (SAAPB).

A serious disadvantage of existing dynamic combinatorial auctions, including the SAAPB, is that they create strategic opportunities for "large" bidders to disadvantage smaller competitors. The problem is that current dynamic combinatorial auctions allow a bidder that does not find the items to be complements to increase his chance of winning or of obtaining a relatively low price by bidding as if the items were complements.

Tables 1 and 2 below illustrate this problem. In Table 1, there are three bidders and two lots. Only Bidder 3 is interested in both lots, but suppose Bidder 3 enjoys no actual synergies from owning both: his payoff from acquiring both is just the sum of the payoffs from acquiring each separately. In this example, the absence of synergies means that there is no exposure problem for combinatorial bidding to remedy. Another feature of the example in Table 1 is that Bidder 3's value for each lot is lower than the value assigned by one of the "smaller" bidders, i.e., bidders who are interested in fewer lots than Bidder 3.

TABLE 1

| | Bidder values | |
|---|---|---|
| | Lot A | Lot B |
| Bidder 1 | 50 | 0 |
| Bidder 2 | 0 | 55 |
| Bidder 3 | 40 | 40 |

If Bidder 3 were forced to bid in open auctions on the individual lots, he would very likely lose the bidding for each lot. The outcome would then be efficient, creating the maximum overall value (of 50+55=105). Suppose, however, that Bidder 3 can make a combinatorial bid of, say, 60 for a package consisting of lots A and B in an open, ascending auction. Bidders 1 and 2 are then forced to play a game of "chicken" with each other. After Bidder 3's bid of 60, Bidder 1 would prefer to wait for Bidder 2 to raise his bid for Lot B so that Bidder 1 can acquire Lot A cheaply. Bidder 2 has the reverse interests. Each may wait for the other to blink. The outcome of this contest is uncertain (using economics terminology, some Nash equilibria involve mixed strategies), but the inefficient outcome in which Bidder 3 wins the lots (and the overall value is only 40+40=80) is more likely in this combinatorial auction than in the SAA, in which the lots are sold individually.

Table 2 illustrates another example. This time lot B should be allocated to Bidder 3 in an efficient allocation (because 40>35). Once again, a bid of 60 by Bidder 3 creates a game of chicken, but this time Bidder 2 has little to gain by helping Bidder 1 to overcome the problem. If Bidder 2 knows this, the coordination problem may prove intractable.

TABLE 2

| | Bidder values | |
|---|---|---|
| | Lot A | Lot B |
| Bidder 1 | 50 | 0 |
| Bidder 2 | 0 | 35 |
| Bidder 3 | 40 | 40 |

In both examples, Bidder 3 has nothing to lose by bidding for combinations before bidding for the individual lots. If Bidders 1 and 2 manage to coordinate well enough to beat the combinatorial bid, Bidder 3 can simply switch from bidding on the combination {AB} to bidding just on the individual lots A and B and do as well as if he had never made a combinatorial bid.

The lesson of these two examples is clear. Dynamic combinatorial bidding makes efficient outcomes less likely in environments without value synergies. In practice, when the auction is being designed, the designer rarely knows much about the actual extent of the value synergies. With the present combinatorial auctions, the designer is left to guess about whether benefits of combinatorial bidding outweigh the damage inflicted by the manipulative use of combinatorial bids. Consequently, even when the potential benefits of combinatorial bidding are very substantial, the designer may choose to forego them. For instance, when a seller or its agent (e.g., an auctioneer) designs a seller's auction without knowing all of the value synergies present for the various potential bidders, he may forego having an auction with combinatorial bidding, even when a combinatorial, design is warranted. (Similarly, a buyer or its agent designing a buyer's auction faces analogous difficulties.) Thus, the strategic opportunities for "large" bidders to disadvantage smaller competitors is a major limitation to the general application of current dynamic combinatorial auction designs.

C. Summary Propositions about Combinatorial Bidding

There are four main propositions about combinatorial bidding that are relevant to the present invention. First, when some goods may be complements for some bidders, combinatorial bidding is a necessary feature of any ascending price-setting system that increases prices for goods in excess demand and achieves efficient outcomes. Second, if goods are discrete and may be complements for some bidders and substitutes for others, then there is no system of individual pricing of lots that can support efficient outcomes: combinatorial pricing is necessary. Third, static combinatorial bidding methods, such as the generalized Vickrey auction, can be acceptable and effective only under a set of highly restrictive conditions that severely limits their practical use. Finally, present implementations of dynamic combinatorial bidding create a strategic opportunity for bidders to bid for "large" packages to improve their own chances of winning lots that interferes with the achievement of economically efficient outcomes.

IV. Prior Art Bid Restrictions: Additive Activity Rules

A number of attempts have been made to improve the efficiency of simultaneous ascending auctions (with or without package bidding) by introducing additive dynamic restrictions called "activity rules" that make a bidder's eligibility for current bidding dependent upon its past bidding activity.

The first such restriction was the so-called "Milgrom-Wilson activity rule," which was adopted by the FCC in 1994 as part of its preferred auction method. Activity rules provide that a bidder may not increase its overall bidding activity late in the auction, that is, a bidder who fails to participate sufficiently at some round of the auction has reduced bidding eligibility at all later rounds of the auction. There are several important practical problems to be resolved in implementing such rules, including identifying appropriate measures of activity and specifying activity requirements that are restrictive enough to promote a rapid pace of the auction but not so restrictive as to disallow legitimate bidding strategies. Several improvements have been made in both of these dimensions since the first SAAs.

In every case, however, the activity rule has remained "additive," i.e., the activity of a bidder is measured by the sum of the activity credits associated with each individual lot. For additive activity rules, a bidder's later bids are not restricted by the composition of his previous bids, i.e., additive activity rules do not impose any "bid composition restrictions" on a bidder.

Recently, Stanford Professor Robert Wilson has suggested an activity rule for the California Power Exchange (PX) daily power auction. The PX auction is a dynamic two-sided "Dutch" auction, in which bidders name prices and quantities and improve their bids and offers over time. Wilson's rule specifies that a bidder who fails in any round to improve a bid or offer that has not resulted in a tentative trade may not later improve that offer. Like the Milgrom-Wilson rule, this rule forces bidders who wish to be active late in the auction to be active continuously throughout the auction. Although the Power Exchange initially accepted Wilson's suggestion, plans to implement any dynamic Dutch auction have since been scrapped. Wilson's rule is also additive—it just measures activity by the amount of electrical power specified in qualifying bids.

Some recent scholarly research has focused on finding additive activity rules for dynamic combinatorial auctions. On the one hand, such rules are thought to be important because the computational problem of searching for the total-price maximizing set of combinatorial bids is very hard (i.e., in mathematical terms, it is an "NP-complete" problem) so that initial rounds of low bidding activity may be particularly damaging. On the other hand, the construction of such rules involves subtle issues that do not arise in simple (non-combinatorial) auctions.

In simple (seller's) auctions, a bid advances the auction when it displaces the existing high bid for a lot. In a combinatorial (seller's) auction, bids are not evaluated individually. Indeed, a tentative non-winning bid may become part of a winning set later in the auction. This consideration makes the construction of a useful activity rule much more difficult in combinatorial auctions.

A team of researchers at the University of Arizona and Caltech (DeMartini, Kwasnica, Ledyard and Porter, 1999) has recently suggested an activity rule that attempts to deal with this problem heuristically. In their experimental tests, their rule appears to improve the performance of their dynamic combinatorial auction. However, the Arizona-Caltech rule is yet another additive activity rule that does nothing to reduce a bidder's strategic incentive to bid for a larger than optimal package.

In the prior art, the bid restrictions that apply during an auction are additive activity rules that measure a bidder's activity by summing the activity weights of the lots covered by bids. For additive activity rules, it is the coverage of the bidder's whole collection of bids—rather than the composition of the individual bids—that determines future bidding eligibility. Because such rules do not distinguish between different collections of bids covering the same lots, they can never mitigate the problematic strategic incentive for combinatorial bidding.

All of the foregoing shows that there is a need to develop combinatorial auction methods and systems that eliminate the problem of bidding for complements, without also creating the strong adverse incentives that produce inefficient auction outcomes.

SUMMARY OF THE INVENTION

The present invention is a new class of dynamic combinatorial auctions that produces more efficient outcomes than prior combinatorial auctions through the use of "bid composition restrictions." The "composition" of a combinatorial bid is the set of lots that the bid covers. For this new class of auctions, to be recorded a bid's composition must satisfy one or more restrictions that depend explicitly or implicitly on the bidder's past history of bidding, i.e., a bidder's prior bid compositions restrict his later bid compositions. In sharp contrast to previous combinatorial auctions with additive activity rule restrictions, this new class of auctions rewards bidders who bid for the smallest relevant combinations at any point during the auction by offering them additional bidding flexibility later in the auction. At the same time, this new class of auctions does not disadvantage bidders who want to bid on large combinations solely to avoid the exposure problem.

In a preferred embodiment, a computer system connects a plurality of auction participants in an auction for a plurality of items. The auction participants typically include a plurality of bidders and either an entity on whose behalf the auction is conducted or the entity's agent. The entity is a seller in a seller's auction, whereas the entity is a buyer in a buyer's auction. For either a buyer's auction or a seller's auction, the entity's agent may be an auctioneer.

The computer system receives bids from a plurality of bidders. Each bid received includes a grouping of one or more items from the plurality of items and a price.

The computer system applies one or more bid composition restrictions to each bid received. Three exemplary types of bid composition restrictions, which may be applied either singly or in combination, are non-additive activity restrictions, subset restrictions, and superset restrictions. The combination of non-additive activity restrictions and superset restrictions can be particularly effective.

The computer system records only those bids that satisfy the applicable bid composition restrictions (and possibly other types of bid restrictions as well). At the end of the auction, a set of bids is selected from the recorded bids. The selection is preferably done by the computer system, but can also be done by a human. For a seller's auction, the selected set of recorded bids will typically maximize a value index, such as the total price received for the plurality of items. For a buyer's auction, the set of recorded bids that either minimizes a cost index, such as the total cost paid for the items being auctioned, or maximizes an index of buyer satisfaction will typically be selected. The selected set of recorded bids is communicated to at least some of the auction participants, such as the seller in a seller's auction, the buyer in a buyer's auction, and possibly the bidders as well.

The foregoing and other embodiments and aspects of the present invention will become apparent to those skilled in the art in view of the subsequent detailed description of the invention taken together with the accompanying figures and appended claims.

DETAILED DESCRIPTION

Figure 1:
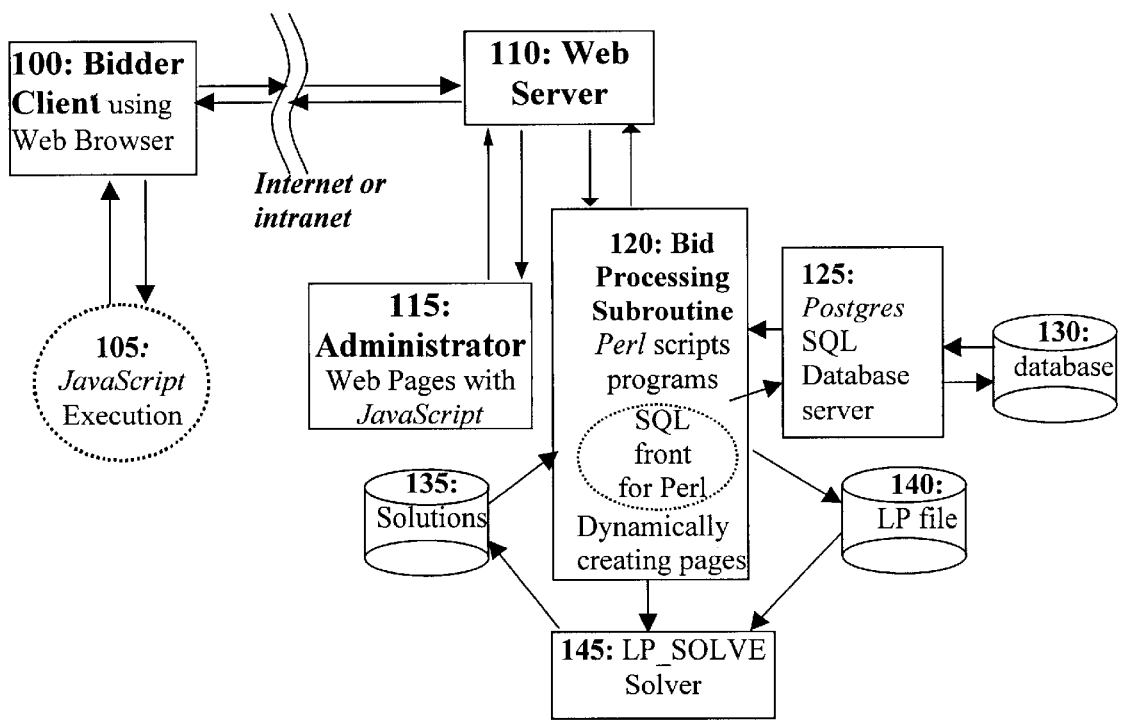
FIG. 1 is a block diagram illustrating an exemplary computer system for conducting combinatorial auctions with bid composition restrictions.

FIG. 1 illustrates an exemplary computer system for performing combinatorial auctions with bid composition restrictions. The implementation of the hardware and software components of the system—other than the bid composition restrictions—will be readily apparent to those skilled in the art because of the use of standard components and technologies, and therefore will not be described in extensive detail here. Indeed, the architecture shown in FIG. 1 is substantially the same as that developed to carry out the SAAPB for the FCC, using the program LP_SOLVE to carry out the optimizations. Moreover, a different system architecture from that described herein could be used to practice the invention without departing from the scope and spirit of the invention.

The exemplary system shown in FIG. 1 comprises a client-server implementation of the auction, which can take place over the Internet or over a private network such as an intranet. Web server 110 has two kinds of clients: bidders 100 and the auction administrator 115. There are at least two bidders who participate in the auction. The auction administrator (auctioneer) 115 may be the seller in a seller's auction or the seller's agent, or it may be the buyer in a buyer's auction or the buyer's agent.

A bidder client 100 runs JavaScript 105 to keep the bidder updated about the state of the auction, including the state of the bidder's own bids and the time remaining in the current round. The administrator web pages. 115 are used to set up auction parameters, generate reports, and send messages to bidders.

Bids, bid cancellations, and queries generated by bidders during the auction are referred to the bid processing subroutine 120. Acceptable bids are entered using the database server 125 to make changes to the auction database 130.

To check bid eligibility or compute round winners, the bid processing subroutine 120 collects relevant data from the database 130, enters it into the optimization dataset (LP file) 140 and initiates an optimization subroutine 145 such as LP_SOLVE. Solutions are stored in the solution database 135, which is used to prepare reports and determine round results.

In one embodiment of the invention, the following commercial components can be used. On the server side, the hardware can include a computer with an Intel Pentium 350 MHz processor, 32 Mb of memory, and a 2 GB hard drive. The network can have a constant TCPIP connection to the Internet with permanent IP. The operating system can be Redhat Linux 5.1. The database server can be a Postgres SQL server. The LP problem solver can be the LP_SOLVE package, which is available in several versions (including a free version at http://www.statslab.cam.ac.uk/~rrwl/opt/lp_solve). An Apache web server can be used. Scripting programming language support can be provided by Perl 5 with the Postgres for Perl Application Programming Interface. On the client side, the hardware, software, and network can be any platform with a TCPIP connection to Internet plus a web browser supporting Java Script. However, this embodiment is just one of many possible alternatives. Numerous components that are well known to those of skill in the art could be used in place of those just described.

Figure 2:
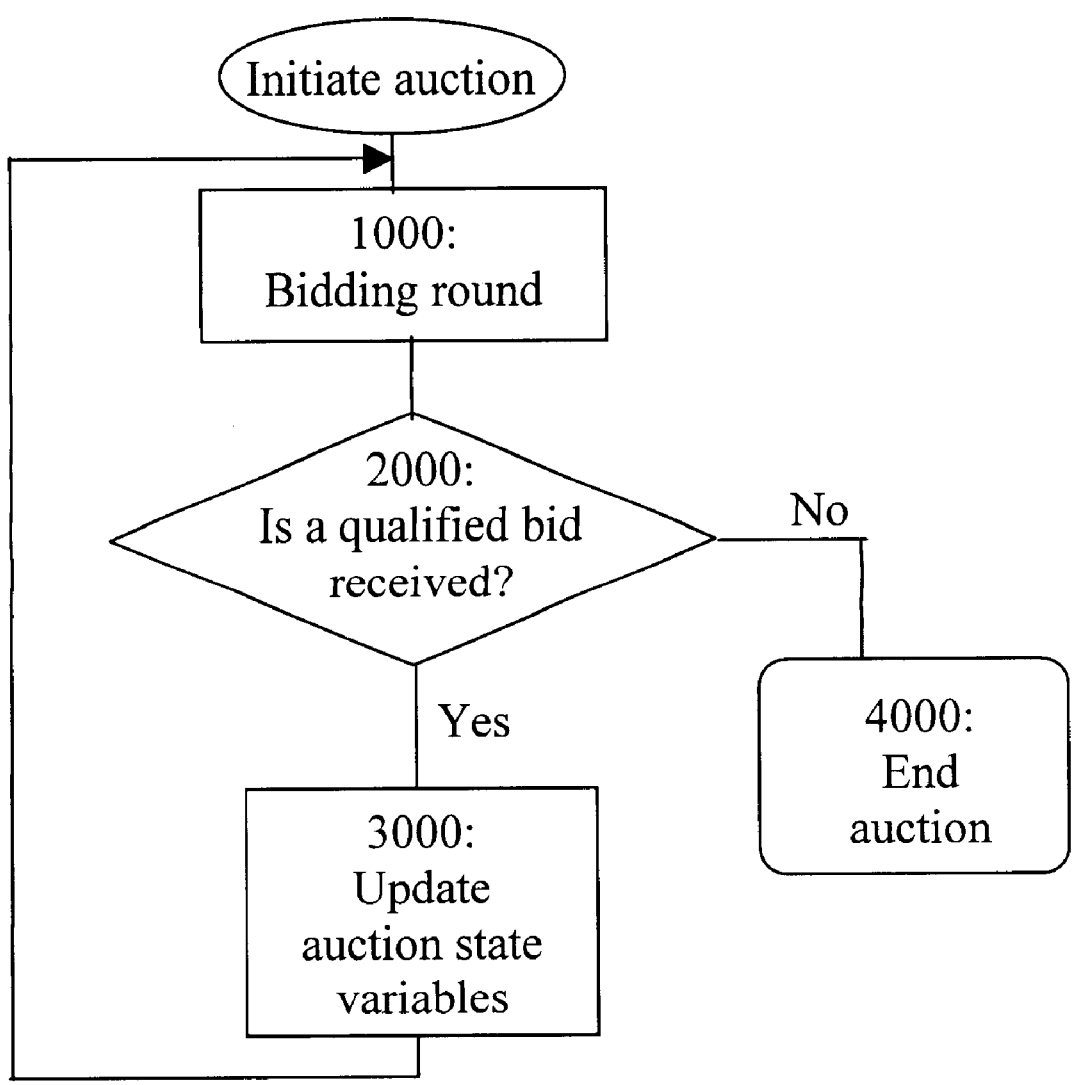
FIG. 2 is a flow chart illustrating an exemplary auction process.

FIG. 2 provides an overview of an exemplary auction process, which consists of a series of bidding rounds 1000. Each bidding round 1000 may begin and end at a predetermined time. Following each bidding round 1000, the system determines, at step 2000 whether any qualified bid has been received. Based on the response, it either ends the auction at step 4000 or updates the auction state variables at step 3000 and moves to the next bidding round 1000. At the end of the auction 4000, a set of bids is selected from the recorded bids. The selection is preferably done by the computer system, but can also be done by a human. For a seller's auction, the selected set of recorded bids will typically maximize a value index, such as the total price received for the plurality of items. For a buyer's auction, the set of recorded bids that either minimizes a cost index, such as the total cost paid for the items being auctioned, or maximizes an index of buyer satisfaction will typically be selected. The selected set of recorded bids is communicated to at least some of the auction participants, such as the seller in a seller's auction, the buyer in a buyer's auction, and possibly the bidders as well.

Figure 3:
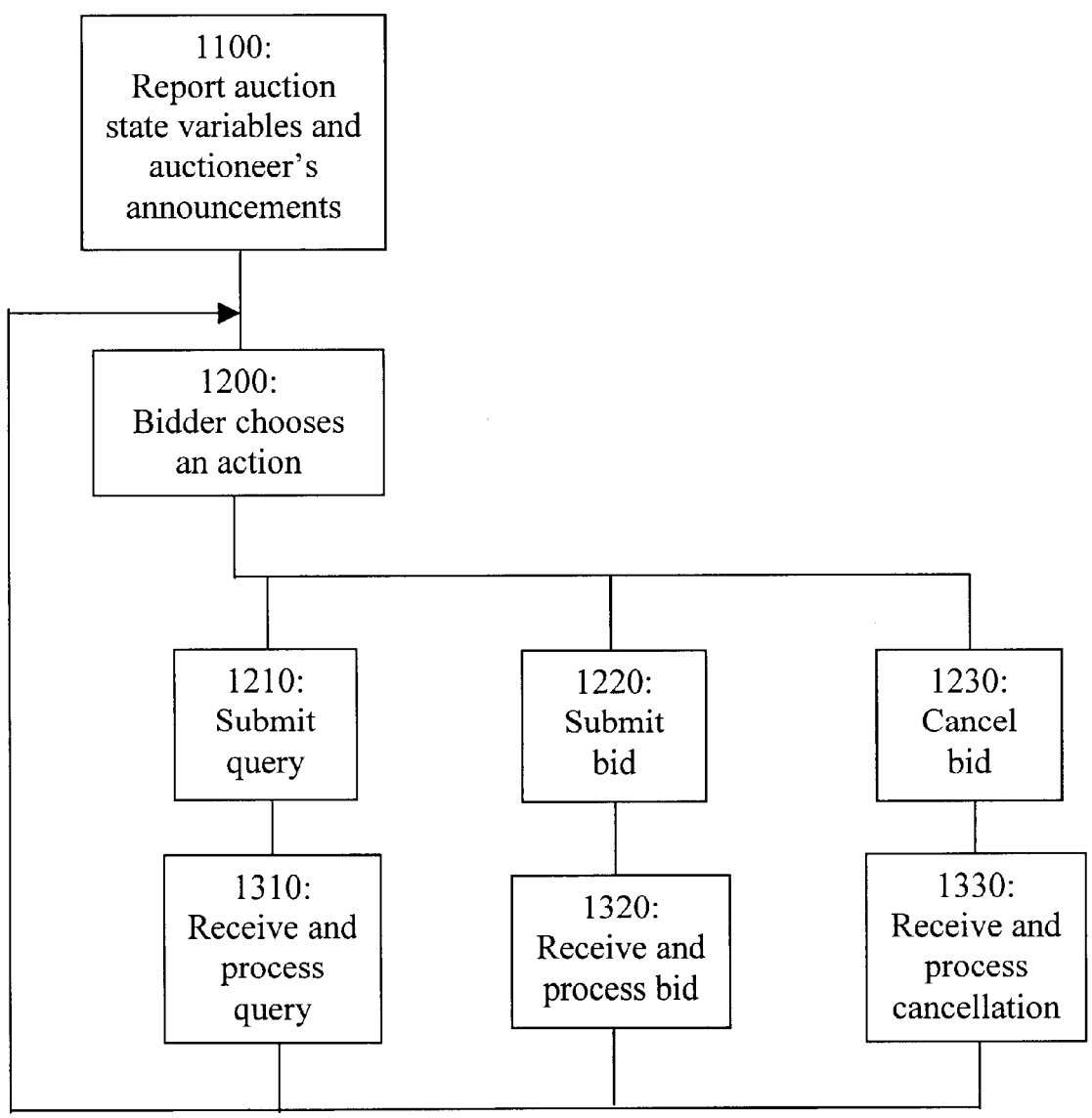
FIG. 3 is a flow chart illustrating an exemplary bidding round.

FIG. 3 illustrates an exemplary bidding round 1000 in more detail. The bidding round 1000 begins with a report of the auction state variables and any announcements by the auctioneer at step 1100. The auction state variables may include any or all of the following:

1. round number,
2. list of all bids received during the prior round,
3. list of tentative winning bids,
4. list of retained bids,
5. each bidder's remaining eligibility,
6. each bidder's subset restrictions,
7. each bidder's superset restrictions, and/or
8. each bidder's remaining waivers.

Announcements by the auctioneer may concern such matters as when bidding rounds 1000 begin and end, error corrections, etc.

During the bidding round 1000, each bidder may choose repeatedly among three actions at step 1200. A bidder may submit a query to determine the minimum acceptable bid for a particular grouping of items at step 1210; a bidder may submit a bid for a particular grouping of items at step 1220, or a bidder may cancel a non-winning bid at step 1230.

If a bidder chooses to submit a query at step 1210, the system will receive and process the query at step 1310. Similarly, if a bidder chooses to submit a bid at step 1220, the system will receive and process the bid at step 1320. Alternatively, if a bidder chooses to withdraw a bid at step 1230, the system will receive and process the withdrawal at step 1330.

Because steps 1310 and 1320 involve the use of bid composition restrictions, a detailed description of three exemplary types of bid composition restrictions—non-additive activity restrictions, subset restrictions, and superset restrictions—will now be given. Following this description, steps 1310, 1320, and 1330 will be discussed in more detail.

I. Non-Additive Activity Restrictions

Activity rules (or restrictions) are described in terms of a measure of bidding activity that associates some number of "points" with each lot offered in the auction. At certain times during the auction, a bidder's active bids are evaluated and the points associated with the lots covered by those bids are summed. For example, if lot A has five points and lot B has two points, then a bidder with outstanding bids covering lots A and B has seven points of activity.

An activity rule specifies that the number of points of activity a bidder has at any time during the auction cannot exceed the bidder's eligibility. The bidder's initial eligibility is set at the beginning of the auction according to criteria determined by the auctioneer. Thereafter, eligibility is periodically updated based on the bidder's most recent eligibility and/or his bidding activity since the last eligibility assessment. In the FCC auctions using the Milgrom-Wilson activity rule, a bidder's eligibility is determined at the end of each bidding round. It is set equal to the minimum of the bidder's previous eligibility and $(x \div y)$, denoted min [previous eligibility, $(x \div y)$], where x is the bidder's activity at the end of the previous round and y is a predetermined fraction that the auctioneer applies to the previous round.

To illustrate, consider the following example:

EXAMPLE 1

Prior Art Additive Activity Rules

There are five lots for sale identified as A through E. The auctioneer has specified that lots A through D are each worth one point and lot E is worth two points. In addition, each bidder initially has three points of eligibility. Thus, each bidder is eligible to bid on any three lots among lots A through D (1+1+1=3) or on lot E plus one other lot (2+1=3). For the init rounds of the auction, the auctioneer sets $y=\frac{1}{2}$.

Suppose that, in the first round, Bidder 1 bids for lot E and Bidder 2 bids just for lot A. Then, Bidder 1's activity during the first round is 2 and Bidder 2's activity is 1. Applying the eligibility formula, Bidder 1's eligibility at the end of the round is min $[3, (2 \div \frac{1}{2})]=3$. Bidder 2's eligibility is min $[3, (1 \div \frac{1}{2})]=2$. This means that beginning at the second round, Bidder 1 may still bid for lots with a total activity weight of 3 (such as lots A, B and C) but Bidder 2 may not then (or ever again) bid for lots with a total activity weight greater than 2. In previous implementations of activity rules for combinatorial bidding, the same result obtains whether Bidder 1 has bid individually for lot E, or individually for lots A and D, or for the combination {AD}.

In sharp contrast to the prior additive activity rules, the non-additive activity restrictions of the present invention measure activity for combinatorial bids in a way that depends not only on the bids covered but also on the sets that contain them. Generally, lower measures of activity apply to larger, more inclusive combinations. For example, the activity weight associated with a combinatorial bid for a combination S might be given by $w(S)=(\Sigma_{x \in S} P(x)^{1/\theta})^\theta$ rounded to the nearest whole number, where P is the number of points assigned to the lot, x identifies the lot, and $\theta$ is a positive real number. Many other non-additive activity measures are also possible. A simple example is $w(S)=(\Sigma_{x \in S} P(x))^{1/2}$. Given the activity weight associated with each bid, a bidder's activity is the maximum weight associated with any consistent set of its active (combinatorial) bids, computed as follows:

$$\max_n \max_{S_1,\ldots,S_n} \sum_{i=1}^{n} w(S_i)$$
$$\text{subject to}$$
$$S_i \cap S_j = \emptyset$$

To illustrate, the following example builds upon Example 1.

EXAMPLE 2

Non-additive Activity Restrictions

Let the lots and lot values be as specified in Example 1. Suppose the weighting formula given in the preceding paragraph is applied with $\theta=0.5$. Table 3 below shows the activity weights associated with each of the possible combinatorial bids.

TABLE 3

| Non-Additive Activity Weights for Combinatorial Bids in Example 2 | | | | | | | | | | |
|---|---|---|---|---|---|---|---|---|---|---|
| Number of lots from A–D in the combination | 0 | 1 | 2 | 3 | 4 | 0 | 1 | 2 | 3 | 4 |
| Lot E included? | No | No | No | No | No | Yes | Yes | Yes | Yes | Yes |
| Activity Weight | 0 | 1 | 1 | 2 | 2 | 2 | 2 | 2 | 3 | 3 |

As Table 3 shows, a bidder in this example who bids on a combination receives less credit than one who bids on lots individually. When the eligibility restriction is applied, this implies that a bidder who has first bid on individual lots can later change to bidding on combinations, but a bidder who first bids on combinations cannot switch back. For example, a bidder who bids on all the lots individually will have a total activity weight of 1+1+1+1+2=6, but a bidder who bids on all the lots as a combination will have a total activity weight of just 3. This characteristic of the non-additive activity restriction penalizes attempts at strategic bidding without foreclosing genuine attempts to avoid the exposure problem. Moreover, non-additive activity restrictions can be readily understood by bidders during the auction because they can be presented as a variation of the familiar additive activity rule format, which involves tracking only a single number.

A further advantage of non-additive activity restrictions is that they can be implemented by modifying just one portion of the existing SAAPB software. The function or routine in the SAAPB software that computes activity for individual bids must be replaced (or supplemented if additive activity restrictions are also applied) by a new routine that applies the new non-additive formula rather than the prior additive formula. The rest of the SAAPB software remains the same.

II. Subset Restrictions

Like activity rules, subset restrictions are rules that limit current bidding based on past bidding patterns. An advantage of these rules is that, unlike activity rules, subset restrictions do not depend on any activity measure. They work as follows.

Given a bid (X, b) with price b made at relevant time t on a relevant set X (a grouping of one or more items from the plurality of items in the auction), the rule restricts the bids that can be made at later times on strict subsets of the set X. For example, a bidder who has once bid on the combination {AB} may thereafter be prohibited from making individual bids on A or B. In a preferred implementation, the relevant times are all times and the relevant sets are all sets X (except "singleton" sets, i.e., sets consisting of a single lot), and the restriction specifies that a bidder who makes a bid (X, b) at any time during the auction is thereafter prohibited from increasing any bid it has previously made on any strict subset Y of set X, i.e., $Y \subset X$. (Bidders are always deemed to have made bids of zero on all lots at the outset of the auction.)

In one embodiment of subset restrictions, a similar restriction is applied after additional bids have been imputed to the bidder. For example, bids may be imputed as follows. If a bidder has made bids $(S_1, b_1)$ and $(S_2, b_2)$ for which $S_1 \cap S_2 = \Pi$, then that bidder is treated as if it had also made the bid $(S_1 \cup S_2, b_1+b_2)$. This process of imputing bids is iterated until no additional bids can be imputed to any bidder. The bid prohibition is then applied only to subsets $S \subset X$ for which $b(S)+b(X-S)<b(X)$, where the function $b(\cdot)$ identifies the highest bid by this bidder associated with each grouping of lots and is set to zero if there is no such bid.

For instance, consider a bidder who bids 10 on lot A and 15 on the combination {BC}, i.e., b(A)=10 and b(BC)=15. This bidder will also have an imputed bid of 25 on the combination {ABC}, i.e., b(ABC)=b(A)+b(BC)=10+15=25. In addition, the bids on B, C, {AB}, and {AC} will be zero because the bidder did not bid on any of these groupings, i.e., b(B)=b(C)=b(AB)=b(AC)=0. Taking X={BC}, the condition b(S)+b(X−S)<b(X) holds for S={B} and X−S={C} [i.e., b(S)+b(X−S)=0+0<15=b(X)] as well as for S={C} and X−S={C} [i.e., 0+0<15], so later bids on B and individually are prohibited by the subset restriction. Similarly, taking X={ABC}, the condition holds for S={AC} and X−S={B} [i.e., 0+0<25] and S={AB} and X−S={C} [i.e., 0+0<25], so later bids on {AC} and {AB} are also prohibited. Finally, notice that the condition does not apply to S={A}, S={BC}, or S={ABC}. For example, taking X={ABC} and S={A}, gives b(S)+b(X−S)=10+15=25=b(X). Consequently, the bidder is not restricted from making further bids on A, {BC}, or {ABC}.

In the situation described in Table 2 above, a subset restriction would impose a risk on Bidder 3 if he chooses to bid for the package {AB}. This restriction would make Bidder 3 reluctant to bid for the package {AB} early in the auction because such a bid would limit his later bidding flexibility, i.e., Bidder 3 could not later bid on A and B individually. Of course, if Bidder 3 was only interested in the {AB} package, then the combination bid on the {AB} package would avoid the exposure problem and the subset restriction would not impose any burden.

III. Superset Restrictions

For very large sets, subset restrictions may be difficult to implement in real-time algorithms on a computer. Moreover, subset restrictions may become ineffective when there are items of low economic value among the lots offered for sale. This problem is called the "Guam" problem, because it comes from consideration of the following example. If subset restrictions had been employed in the FCC personal communications services spectrum auction, a bidder that was prohibited from bidding for a Chicago license because it had previously bid for the {Chicago, Detroit} pair would still be eligible to bid for the {Chicago, Guam} pair. Given the very low economic value of the Guam license, such a bid is effectively a bid-for the Chicago license, but one that avoids the intended restriction against bids for Chicago alone. In such cases, "superset restrictions" can be employed to replicate the main advantages of subset restrictions, but with greater simplicity, a much lower computational and storage burden, and without the same vulnerability to the Guam problem.

A "superset" of a specific lot A is a set that contains lot A. Superset restrictions work by imposing a "minimum superset size" for each bid on a specific lot for each bidder. Initially, the minimum superset size associated with each lot is the size of the lot (as measured, for example, by its activity weight). In a preferred implementation, after a new bid is made for a superset of a specific lot, that is, a group of lots containing a specific lot, the new minimum size for the superset containing the specific lot is the larger of the previous minimum size or the size of the new bid.

EXAMPLE 3

Superset Restrictions

Consider the situation previously described in Examples 1 and 2. Suppose Bidder 1 makes a bid for the combination {ACD} (with size 1+1+1=3) in the first round. After this bid, the minimum superset sizes associated with the each of the specific lots for Bidder 1 change as follows:

TABLE 4

| Lot ID | Minimum Superset Size for Bidder 1 for Each Specific Lot at the Beginning of the Round | |
|---|---|---|
| | Round 1 | Round 2 |
| A | 1 | 3 |
| B | 1 | 1 |
| C | 1 | 3 |
| D | 1 | 3 |
| E | 2 | 2 |

In this situation, the bids by Bidder 1 after round 1 are restricted so that, for example, an eligible bid for a combination that includes lot C must involve a superset size of at least 3. Unlike subset restrictions, nothing in this rule prevents the bidder from bidding on, say, the combination {CE}, which has the requisite size (1+2=3). However, a bidder that bids for large combinations will not be able to switch to smaller combination late in the auction. For instance, Bidder 1 could not subsequently bid for just lot C because the size of set C alone (i.e., 1) is less than the minimum size of the superset that must contain lot C (i.e., 3). This example also shows that the data requirements for superset restrictions include just one additional number for each lot and bidder, which is more than required by non-additive activity restrictions but much less than required by subset restrictions.

It is straightforward to see that superset restrictions would have the same effect as the subset restrictions in the two cases illustrated in Tables 1 and 2. The restrictions would discourage unnecessary combinatorial bids. In addition, the superset restrictions encourage the submission of "less concentrated" bids generally. Thus, if a bidder is considering bids on {ABC} or {AD}, he may opt to submit a bid on {AD} first, since that preserves the bidder's option to switch to a bid on {ABC} in a later round.

The superset restrictions just described measure the "size" of a bid using the same index as the activity rule. This need not be the case. Indeed, the size measure can be constructed in ways that recognize the logical or physical structure of the auction situation. For example, suppose that the auction is one for spectrum licenses associated with various geographical areas. The activity index might be the population of the license area, or some reasonable surrogate for the population.

Bid composition restrictions like superset restrictions, subset restrictions, and non-additive activity restrictions all encourage disaggregated bids because they make bidding on certain larger combinations irreversible. Thus, a bidder considering a bid for all items as one large combination is committing to an all-or-nothing strategy, which has a much higher risk than bids for all the items individually or in smaller combinations. This risk, however, will not affect bidders who are only interested in bidding on large combinations and who want to avoid the exposure problem.

Given the foregoing description of exemplary bid composition restrictions, the software coding needed to implement these restrictions in existing auction software (e.g. the SAAPB software) will be readily apparent to programmers of ordinary skill in the art.

Figure 4:
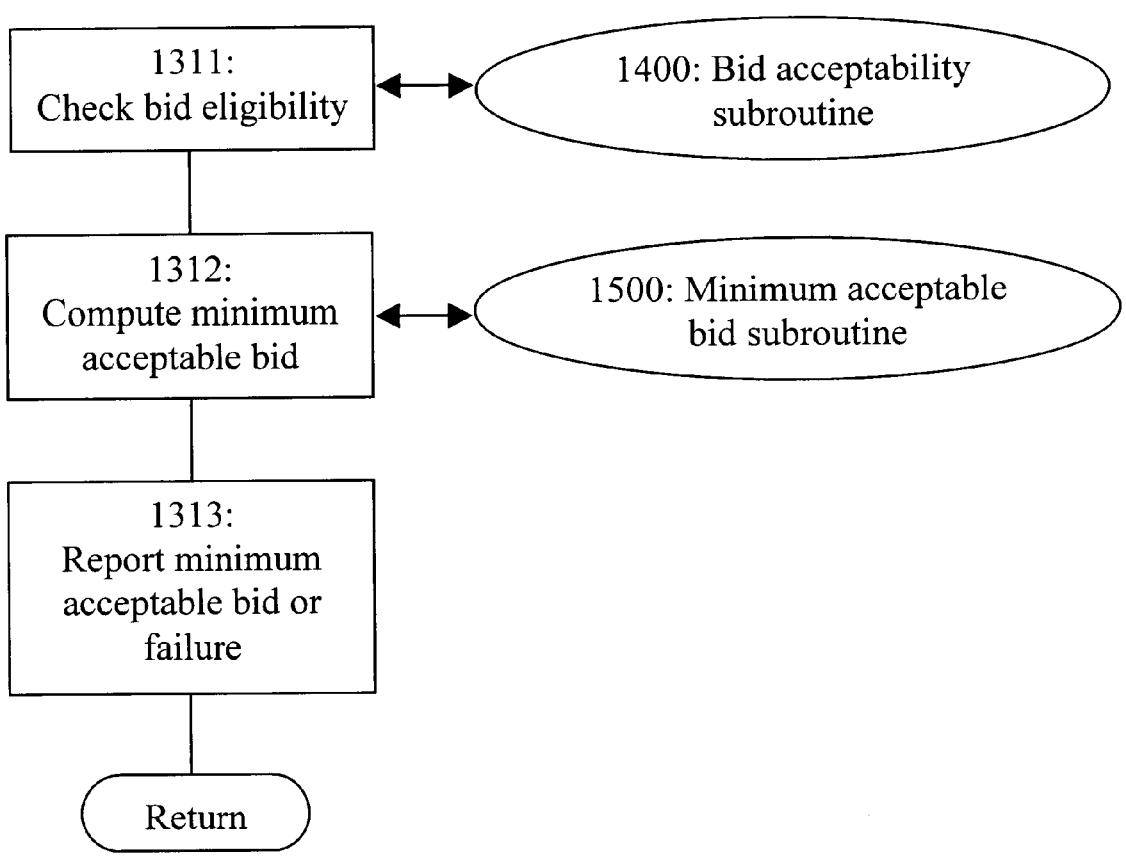
FIG. 4 is a flow chart illustrating an exemplary method for processing a query.

Having described three exemplary embodiments of bid composition restrictions in detail, the processing of a query 1310 will now be described with reference to FIG. 4. At step 1311, the system checks whether the bidder is eligible to make a proposed bid by checking the bid composition restriction(s). This checking is done by a call to the bid acceptability subroutine 1400. This subroutine 1400 applies restrictions, including one or more bid composition restrictions, to each bid received. The minimum acceptable bid for the package is then computed at step 1312 by a call to the minimum acceptable bid calculation subroutine 1500. At step 1313, the system reports back to the bidder the level of the minimum acceptable bid and whether the bidder is eligible to make that bid.

Figure 5:
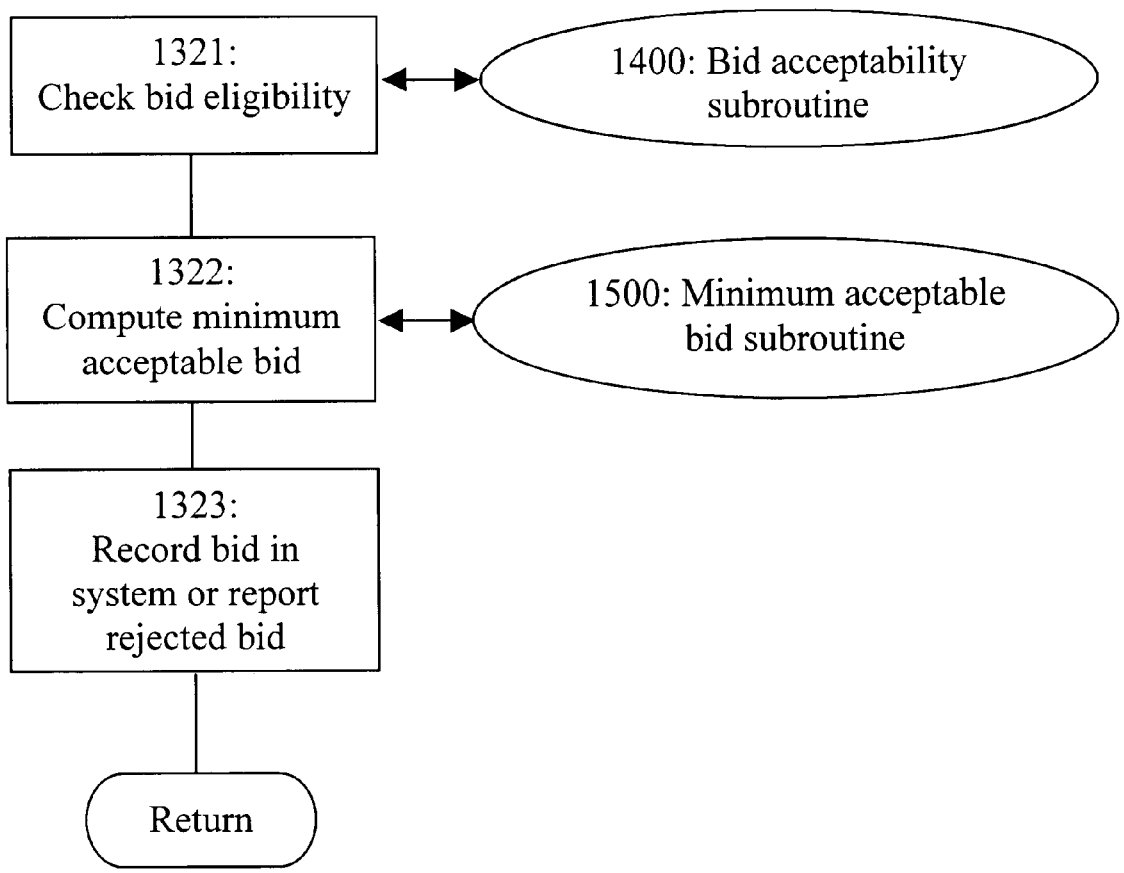
FIG. 5 is a flow chart illustrating an exemplary method for processing a bid.

FIG. 5 shows processing of a bid 1320 in greater detail. At step 1321, the system checks the bidder's eligibility to make a particular bid by making a call to the bid acceptability subroutine 1400. This subroutine 1400 applies restrictions, including one or more bid composition restrictions, to each bid received. The minimum acceptable bid for the package is then computed at step 1322 by a call to the minimum acceptable bid calculation subroutine 1500. At step 1323, the system either records an acceptable bid that satisfies the applied bid composition and minimum bid restrictions or reports that the bid has been rejected.

Figure 6:
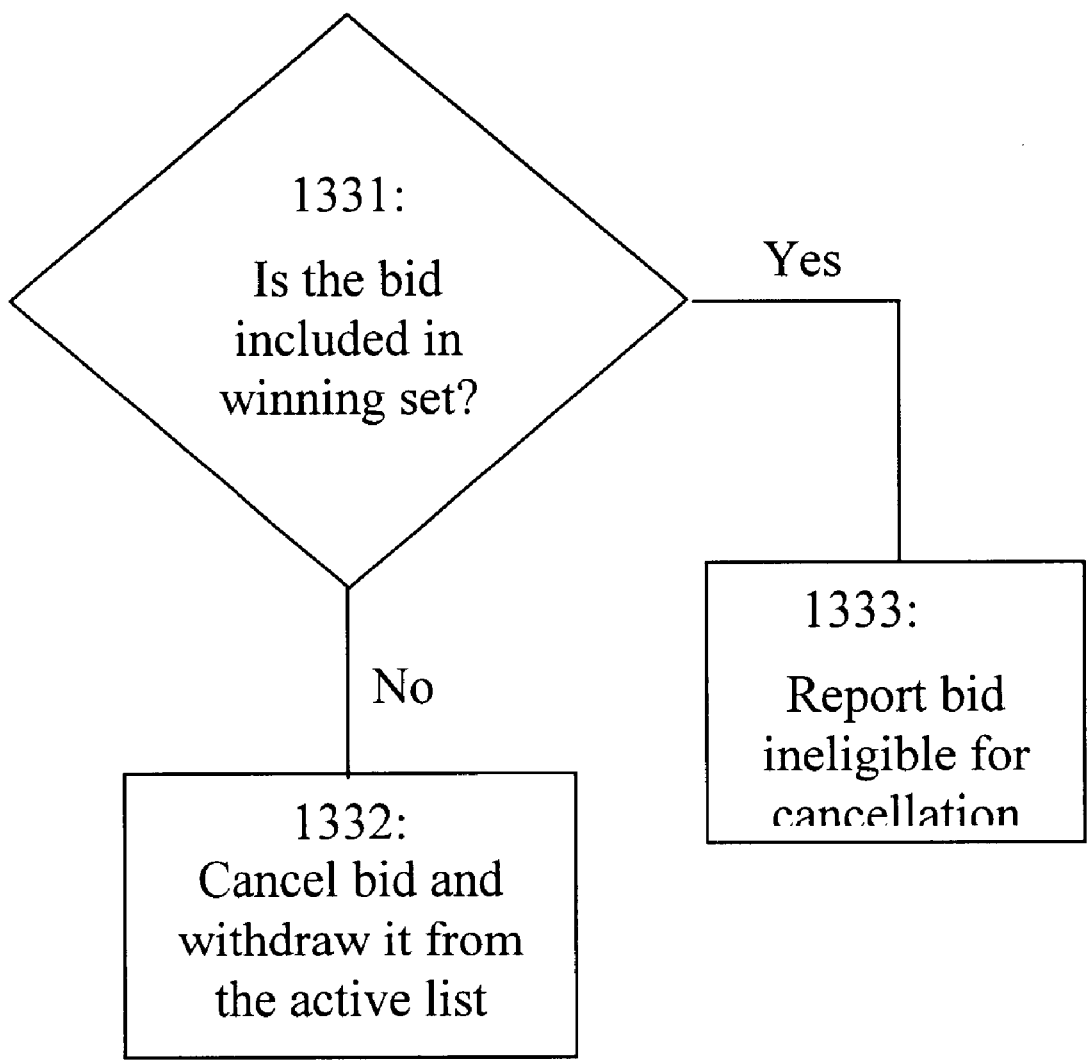
FIG. 6 is a flow chart illustrating an exemplary method for processing a bid cancellation.

FIG. 6 shows an exemplary embodiment of a method for processing a bid cancellation 1330 in greater detail. At step 1331, the bid is tested to see if it is part of the current winning set. If it is, then the bid is ineligible for cancellation and the system reports this fact at step 1333. If the bid is not part of the current winning set, then it may be withdrawn from the current bid list at step 1332.

Figure 7:
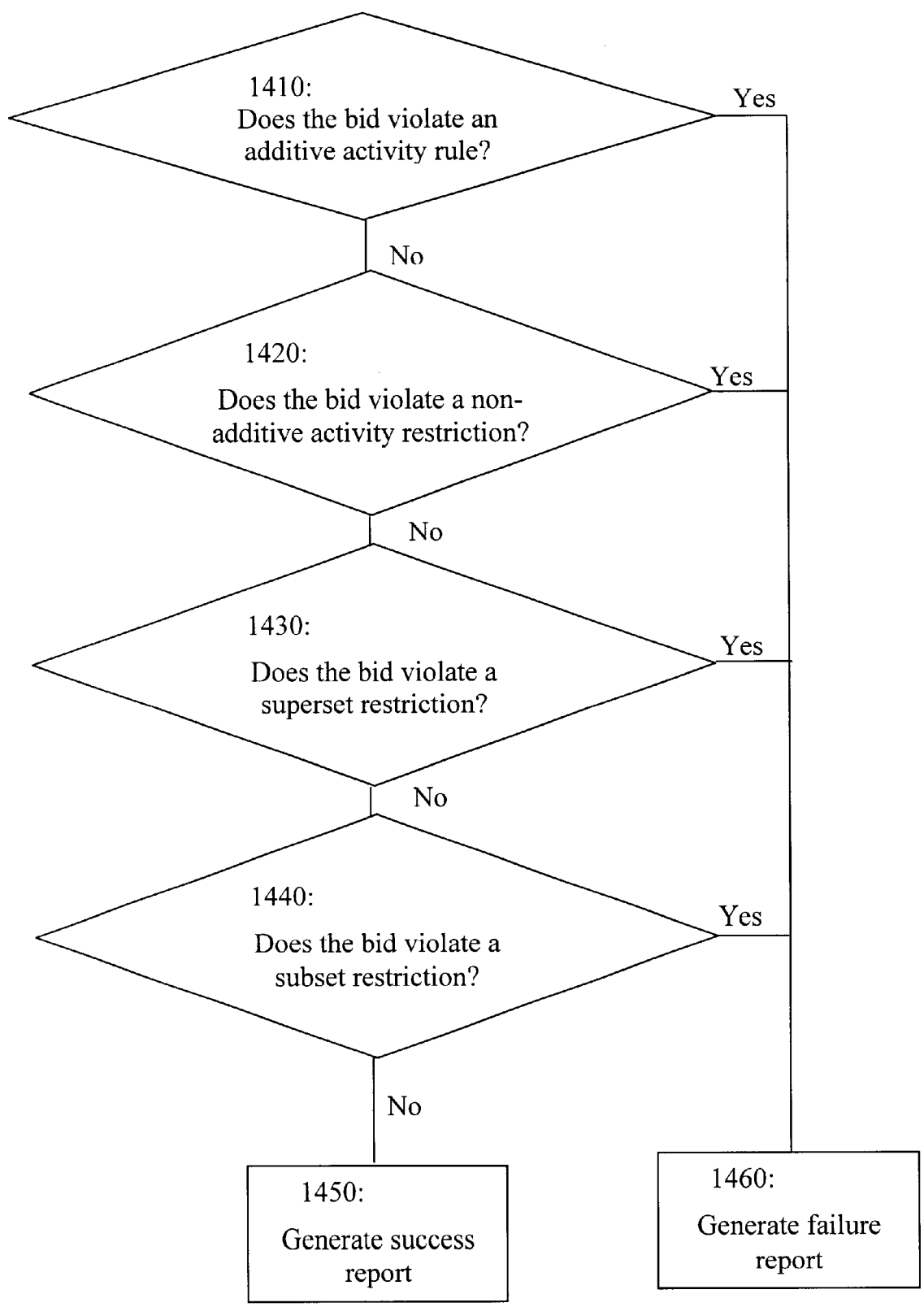
FIG. 7 is a flow chart illustrating an exemplary method for checking bid composition restrictions to determine if a particular bid is acceptable.

FIG. 7 shows an exemplary embodiment of a method for checking whether a particular bid is acceptable. The bid acceptability subroutine 1400 proceeds by checking any applicable additive activity restrictions at step 1410, non-additive activity restrictions at step 1420, superset restrictions at step 1430, and subset restrictions at step 1440. The system then generates a success report at step 1450 or a failure report at step 1460. It will be apparent to those skilled in the art that the bid acceptability subroutine 1400 need not apply all of the bid composition restrictions shown in steps 1420-1440 of FIG. 7. Various bid composition restrictions can be used alone or in combination provided that they penalize attempts at strategic bidding without ruling out genuine attempts to avoid the exposure problem.

The various embodiments described above should be considered as merely illustrative of the present invention. They are not intended to be exhaustive or to limit the invention to the forms disclosed. Those skilled in the art will readily appreciate that still other variations and modifications may be practiced without departing from the general spirit of the invention set forth herein. Therefore, it is intended that the present invention be defined by the claims that follow.

What is claimed is:

1. In a computer system connected to a plurality of auction participants, said auction participants including a plurality of bidders and either an entity on whose behalf the auction is conducted or the entity's agent, a method for auctioning a plurality of items using bid composition restrictions, comprising the steps of:

a) in said computer system, receiving bids from at least some of said bidders, wherein each bid received comprises a grouping of one or more items from said plurality of items and a price;

b) applying to a bid received from a bidder one or more bid composition restrictions, according to which the composition of said bid is restricted based on the composition of one or more prior bids from said bidder;

c) recording only bids that satisfy bid restrictions, wherein said bid restrictions must include the applied bid composition restrictions;

d) selecting a set of recorded bids; and e) communicating the selected set of recorded bids to at least some of the auction participants.

2. The method of claim 1, wherein the bid composition restrictions, comprise non-additive activity restrictions.

3. The method of claim 1, wherein the bid composition restrictions comprise subset restrictions.

4. The method of claim 1, wherein the bid composition restrictions comprise superset restrictions.

5. The method of claim 1, wherein the selected set of recorded bids maximizes a value index.

6. The method of claim 5, wherein the value index is the total price received for the plurality of items.

7. The method of claim 1, wherein the selected set of recorded bids minimizes a cost index.

8. The method of claim 7, wherein the cost index is the total cost paid for the plurality of items.

9. The method of claim 1, wherein the selected set of recorded bids maximizes an index of buyer satisfaction.

10. The method of claim 1, wherein the selecting step is performed by a human.

11. The method of claim 1, wherein the selecting step is performed by the computer.

12. A computer system for auctioning a plurality of items using bid composition restrictions, said computer system connected to a plurality of auction participants, said auction participants including a plurality of bidders and either an entity on whose behalf the auction is conducted or the entity's agent, comprising:

a) means for receiving bids from at least some of said bidders, wherein each bid received comprises a grouping of one or more items from said plurality of items and a price;

b) means for applying to a bid received from a bidder one or more bid composition restrictions, according to which the composition of said bid is restricted based on the composition of one or more prior bids from said bidder;

c) means for recording only bids that satisfy bid restrictions, wherein said bid restrictions must include the applied bid composition restrictions;

d) means for selecting a set of recorded bids; and e) means for communicating the selected set of recorded bids to at least some of the auction participants.

13. The system of claim 12, wherein the bid composition restrictions comprise non-additive activity restrictions.

14. The system of claim 12, wherein the bid composition restrictions comprise subset restrictions.

15. The system of claim 12, wherein the bid composition restrictions comprise superset restrictions.

16. The system of claim 12, wherein the selected set of recorded bids maximizes a value index.

17. The method of claim 16, wherein the value index is the total price received for the plurality of items.

18. The system of claim 12, wherein the selected set of recorded bids minimizes a cost index.

19. The method of claim 18, wherein the cost index is the total cost paid for the plurality of items.

20. The method of claim 12, wherein the selected set of recorded bids maximizes an index of buyer satisfaction.

21. A machine readable medium having stored thereon data representing sequences of instructions, which when executed by a computer system for auctioning a plurality of items using bid composition restrictions, said computer system connected to a plurality of auction participants, said auction participants including a plurality of bidders and either an entity on whose behalf the auction is conducted or the entity's agent, cause said computer system to perform the steps of:

a) in said computer system, receiving bids from at least some of said bidders, wherein each bid received comprises a grouping of one or more items from said plurality of items and a price;

b) applying to a bid received from a bidder one or more bid composition restrictions, according to which the composition of said bid is restricted based on the composition of one or more prior bids from said bidder;

c) recording only bids that satisfy bid restrictions, wherein said bid restrictions must include the applied bid composition restrictions;

d) selecting a set of recorded bids; and e) communicating the selected set of recorded bids to at least some of the auction participants.

* * * * *